United States Patent
Le et al.

(10) Patent No.: US 7,080,241 B2
(45) Date of Patent: Jul. 18, 2006

(54) MECHANISM FOR SELF-INITIATED INSTRUCTION ISSUING AND METHOD THEREFOR

(75) Inventors: Hung Qui Le, Austin, TX (US); Hoichi Cheong, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 881 days.

(21) Appl. No.: 09/903,828

(22) Filed: Jul. 11, 2001

(65) Prior Publication Data

US 2001/0042192 A1    Nov. 15, 2001

Related U.S. Application Data

(63) Continuation of application No. 09/156,133, filed on Sep. 17, 1998, now Pat. No. 6,308,260.

(51) Int. Cl.
 *G06F 9/00* (2006.01)
(52) U.S. Cl. .................. 712/245; 712/215; 712/220
(58) Field of Classification Search ............ 712/215, 712/23, 244, 236, 218, 214, 216, 217, 245, 712/220; 710/260
See application file for complete search history.

(56) References Cited

U.S. PATENT DOCUMENTS

| | | | | |
|---|---|---|---|---|
| 5,875,340 A | * | 2/1999 | Quarnstrom et al. ........ 710/260 |
| 5,887,161 A | * | 3/1999 | Cheong et al. ............. 712/244 |
| 5,913,048 A | * | 6/1999 | Cheong et al. ............. 712/215 |
| 5,974,524 A | * | 10/1999 | Cheong et al. .............. 712/23 |
| 6,061,785 A | * | 5/2000 | Chiarot et al. ............. 712/236 |
| 6,098,168 A | * | 8/2000 | Eisen et al. ................ 712/218 |
| 6,112,019 A | * | 8/2000 | Chamdani et al. .......... 712/214 |
| 6,212,623 B1 | * | 4/2001 | Witt .......................... 712/216 |
| 6,289,437 B1 | * | 9/2001 | Eisen et al. ................ 712/217 |
| 6,308,260 B1 | * | 10/2001 | Le et al. .................... 712/215 |

\* cited by examiner

*Primary Examiner*—Jungwon Chang
(74) *Attorney, Agent, or Firm*—Winstead Sechrest & Minick P.C.; Diana L. Roberts-Gerhardt

(57) ABSTRACT

An apparatus and method for self-initiated instruction issuing are implemented. In a central processing unit (CPU) having a pipelined architecture, instructions are queued for issuing to the execution unit which will execute them. Instructions are issued each cycle, and an instruction should be selectable for issuing as soon as its source operands are available. An instruction in the issue queue having source operands depending on other, target, instructions to determine their value are signaled to the target instruction by a link mask in the queue entry corresponding to the target instruction. A bit in the link mask identifies the queue entry corresponding to the dependent instruction. When the target instruction issues to the execution unit, a bit is set in a predetermined portion of the queue entry containing the dependent instruction. The portion of the queue entry is associated with the source operand depending on the issuing instruction. This bit informs selection logic circuitry that the dependency is resolved by the issuing instruction, and the dependent instruction may be selected for issuing.

4 Claims, 7 Drawing Sheets

MECHANISM FOR SELF-INITIATED INSTRUCTION ISSUING AND METHOD THEREFOR

This application is a continuation of application Ser. No. 09/156,133, filed on Sep. 17, 1998, now U.S. Pat. No. 6,308,260.

TECHNICAL FIELD

The present invention relates in general to a data processing system, and in particular, to an instruction issuing mechanism in a data processing system.

BACKGROUND INFORMATION

High performance central processor unit (CPU) design requires that instruction scheduling circuitry be able to schedule and issue instructions to the execution units every cycle. In particular, when a first instruction issues, the issuing logic must be able to schedule a second instruction, depending on the first instruction for one of its source operands, immediately after the first instruction is issued.

Figure 1:
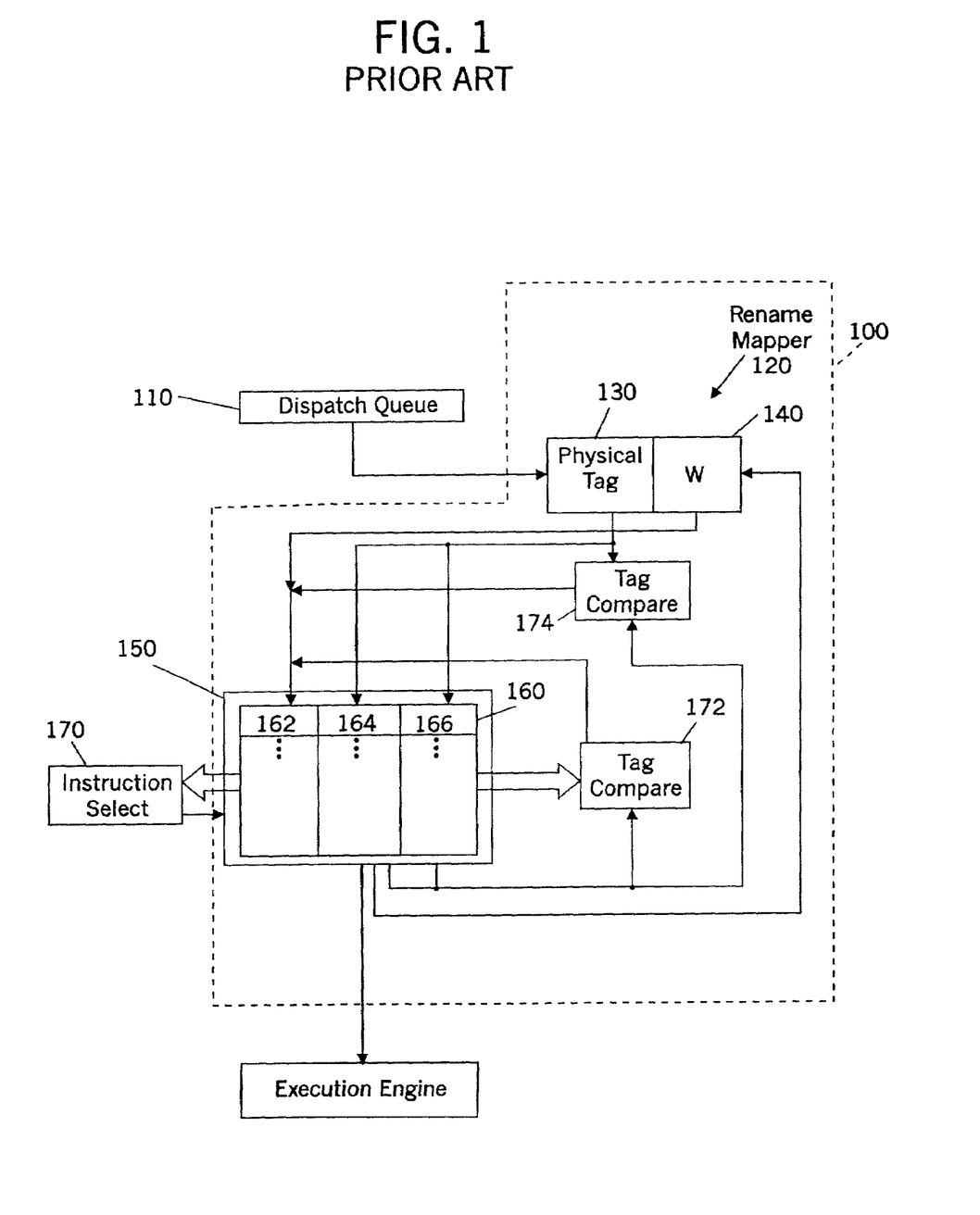
FIG. 1 illustrates, in block diagram form, an instruction scheduling/issuing mechanism in accordance with the prior art.

Refer now to FIG. 1 in which is illustrated a mechanism 100 for instruction scheduling according to the prior art. Instructions are loaded in order from an external memory device (not shown) into dispatch queue 110 from which they are sent to scheduling and issuing mechanism 100, which is a portion of an execution unit (not shown) in the CPU (not shown).

Instruction operands are associated with architected register devices into which result (or target) operands are stored, and from which source operands are retrieved. Architected register devices are logical pointers associated with a physical register device via rename register device (mapper) 120, which receives instructions dispatched from dispatch queue 110.

Rename register device 120 includes an operand tag portion 130 and a W-field portion 140. Operand tags correspond to physical operand addresses and are associated with the logical source and target registers. They are sent along with the corresponding instruction to issue queue 150. Issue queue 150 includes a plurality of entries 160 including a W-field portion 162, a target tag portion 164, and a source tag portion 166. Each entry 160 also includes an opcode portion (not shown) and a control information portion (not shown). Source and target tags are received from physical tag portion 130 in rename register device 120 and loaded into target tag portion 164 and source tag portion 166, respectively. W data values stored in W-field 162 are used to determine when the source operands are available to their corresponding instruction in issue queue 150. When all source operands are available, the corresponding instruction may be issued. W-field 162 may contain a plurality of bits, each of which is associated with an instruction source operand. An instruction may be issued when all of its W-bits are active. Instruction select logic 170 selects an instruction for issuing from among all ready instructions. Instruction select logic 170 selects from among all instructions ready for issue using a select algorithm which, for example, may select the oldest ready instruction as the next instruction to issue.

When an instruction is selected and issued, its target operand tag in portion 164 is broadcast to all entries 160 in instruction queue 150. The broadcast operand tag is compared to all source operand tags in portion 166 of entries 160 by tag compare logic 172. If a source operand tag in an entry 160 corresponds with the broadcast tag, then the W-bit in portion 162 of entry 160 for the corresponding source operand is set.

Similarly, at an instruction issue, the W-bit in W-field 140 of rename register device 120 corresponding to the target operand tag of the issuing instruction is set. An instruction dispatched from dispatch queue 110 reading the corresponding location in rename register device 120 to obtain the corresponding physical tag also obtains the W-bit in the corresponding W-field 140 which is then in-gated into issue queue 150 in portion 162 along with the source operand tag in portion 166. In this way, the dispatched instruction is informed that the corresponding source operand is already available.

A dispatching instruction that is being in-gated into issue queue 150 as an instruction is issued from issue queue 150, uses the broadcast tag described hereinabove to set its W-bits. Tag compare logic 174 compares the broadcast operand tag from the issuing instruction with the source operand tag of the dispatching instruction that is being in-gated into issue queue 150. If a match occurs, the W-bit corresponding to the source operand matching the broadcast operand tag is set as the W-bit is in-gated to issue queue 150.

As the speed of CPUs increase, and the cycle time correspondingly becomes shorter, the task of setting instruction W-bits to schedule dependent instructions becomes prohibitive, in scheduling issuing mechanism 100 according to the prior art. If scheduling/issuing mechanism 100 cannot resolve the instruction dependencies in a cycle time, then dependent instructions cannot be issued in a pipeline fashion. Thus, there is a need in the art for a self-initiated issuing mechanism that permits the pipelined issuing of dependent instructions in a high speed CPU.

SUMMARY OF THE INVENTION

The aforementioned needs are addressed by the present invention. Accordingly, there is provided, in a first form, an apparatus for self-initiated instruction issuing. The apparatus includes an instruction queue operable for issuing at least one instruction to an execution unit. The queue includes a plurality of entries, each queue entry having a first portion and a second portion, wherein the first portion is operable for storing a first link data value and the second portion is operable for storing a first data value. The first data value in a first queue entry is set in response to a first link data value in a preselected second queue entry. At least one instruction is selected for issuing in response to a predetermined first data value in a corresponding queue entry.

Additionally, there is provided, in a second from, a method of self-initiated instruction issuing. The method includes the steps of setting a predetermined data value in a first portion of a preselected first queue entry in a queue operable for storing a plurality of instructions for issuing to an execution unit. The queue includes a plurality of entries, each entry being associated with an instruction for issuing, wherein the first queue entry is preselected in response to a first data value in a second portion of a preselected second queue entry. An instruction associated with the entry containing the predetermined data value in the first portion is selected in response to the data value.

Finally, there is provided in a third form, a data processing system for self-initiated instruction issuing. The data processing system includes an input means for communicating a plurality of instructions, a dispatch unit coupled to the input means, and at least one execution unit coupled to the dispatch unit for receiving instructions communicated therefrom, wherein each execution unit includes a self-initiated instruction issue mechanism for receiving the instructions and issuing instructions to an execution logic circuit for execution. The self-initiated issue mechanism contains an instruction queue operable for issuing at least one instruction to the execution unit, wherein the queue including a plurality of entries, each queue entry having a first portion and a second portion, the first portion being operable for storing a first link data value and the second portion being operable for storing a first data value. The first data value in a first queue entry is set in response to a first link data value in a preselected second queue entry. The data processing system also includes a rename register device coupled to the queue, the rename register device including a plurality of entries, each of which has a first portion operable for storing a pointer data value and a second portion operable for storing a validity data value, wherein each pointer data value is associated with a corresponding queue entry, and wherein each first link data value is set in response to the pointer data values and the validity data values.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides a self-initiated instruction scheduling and issuing mechanism for the pipelined issuing of dependent instructions in fast CPUs. Instruction dependencies are resolved in an augmented instruction queue (ISQ) that includes fields for associating instruction source operands with the queued target instruction. Additionally, for instructions that take more than one cycle to execute, a broadcast tag with a delayed comparison is used to resolve instruction dependencies.

Operation of the present invention will subsequently be described in greater detail. Prior to that discussion, however, a description of connectivity of the elements of the present invention will be provided.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
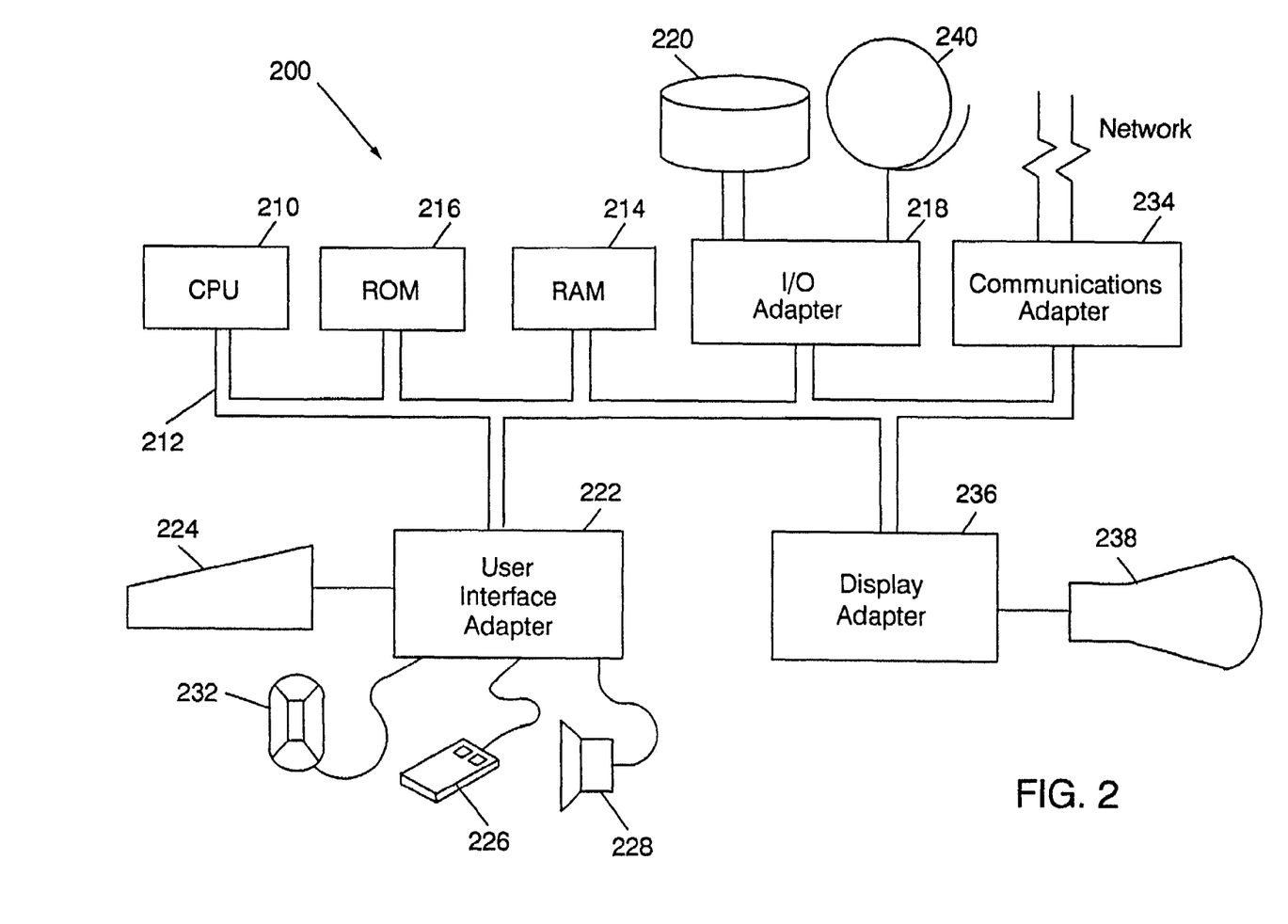
FIG. 2 illustrates, in block diagram form, a data processing system in accordance with an embodiment of the present invention.

Referring now to FIG. 2, an example is shown of a data processing system 200 which may be used for the invention. The system has a central processing unit (CPU) 210. The self-initiated scheduling and issuing mechanism of the present invention is included in CPU 210. The CPU 210 is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communicate with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238. Additionally, an operating system is used to coordinate the functions of the various components shown in FIG. 2.

Figure 3:
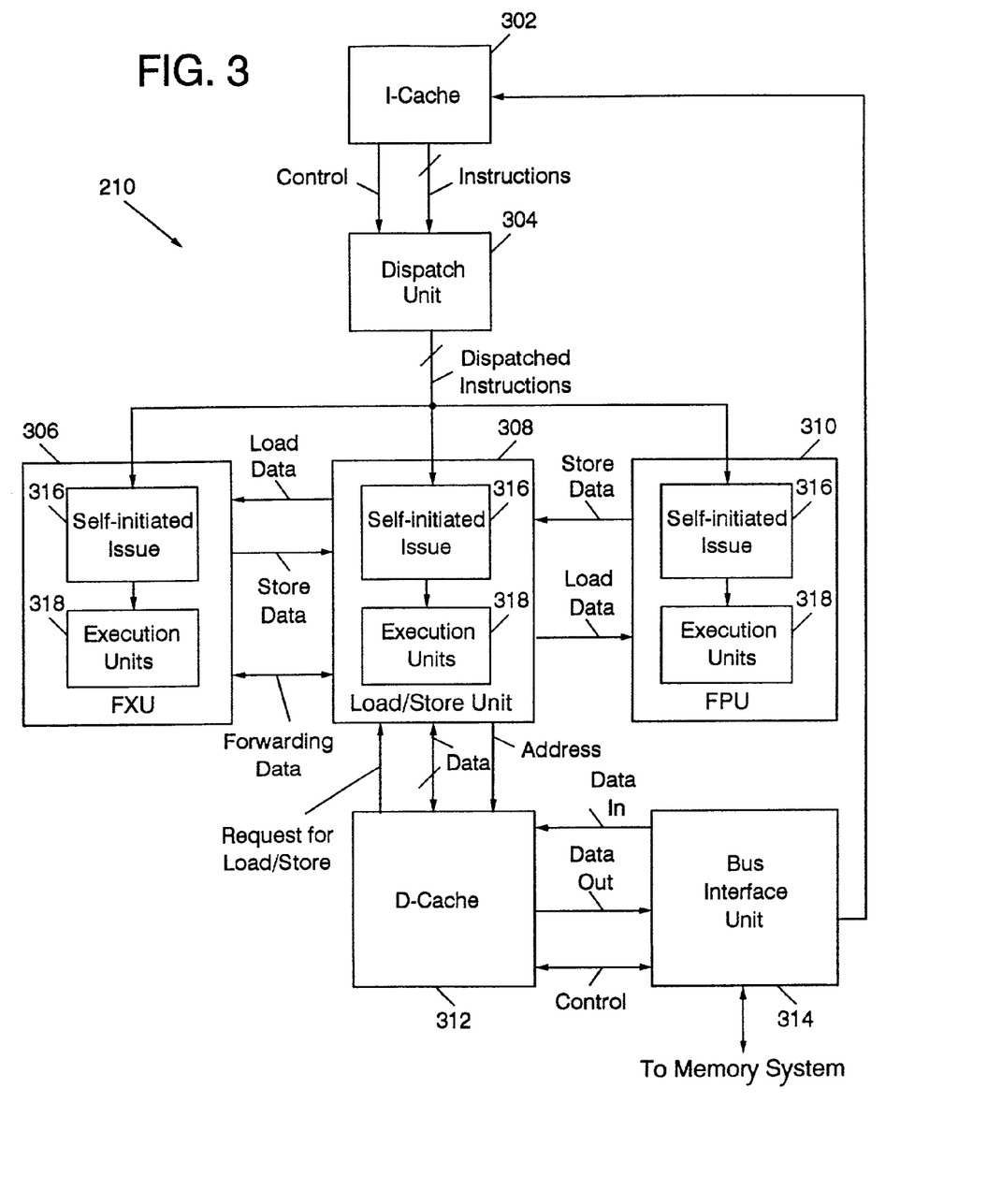
FIG. 3 illustrates, in block diagram form, a central processing unit in accordance with an embodiment of the present invention.

FIG. 3 illustrates a portion of CPU 210 in greater detail. The portion of CPU 210 comprises an instruction cache (I-cache) 302, a dispatch unit 304, a fixed point execution unit (FXU) 306, load/store unit 308, floating point unit (FPU) 310, a data cache (D-cache) 312, and a bus interface unit (BIU) 314. Each of FXU 306, load/store unit 308, and FPU 310 includes self-initiated issuing mechanism 316 in a plurality of execution units 318. I-cache 302 is coupled to dispatch unit 304 to communicate control information in a plurality of instructions. Dispatch unit 304 is coupled to self-initiated issuing unit 316 in each of FXU 306, load/store unit 308, and FPU 310 to provide a plurality of dispatched instructions. I-cache 302 is coupled to BIU 314 to communicate data and control information. FXU 306 is coupled to load/store unit 308 to communicate a load data value, a store data value, and a forwarding data value. Load/store unit 308 is coupled to FPU 310 to communicate a store data value and a load data value. Load/store unit 208 is also coupled to D-cache 312 to communicate a request for a load/store signal, a plurality of data values and an address value. D-cache 312 is coupled to bus interface unit 314 to communicate a data in signal, a data out signal, and a control signal. Self-initiated issuing mechanism 316 is coupled to one or more execution units 318 in each of FXU 306, Load/Store 308 and FPU 310 to communicate control information in at least one instruction.

Figures 4, 4B:
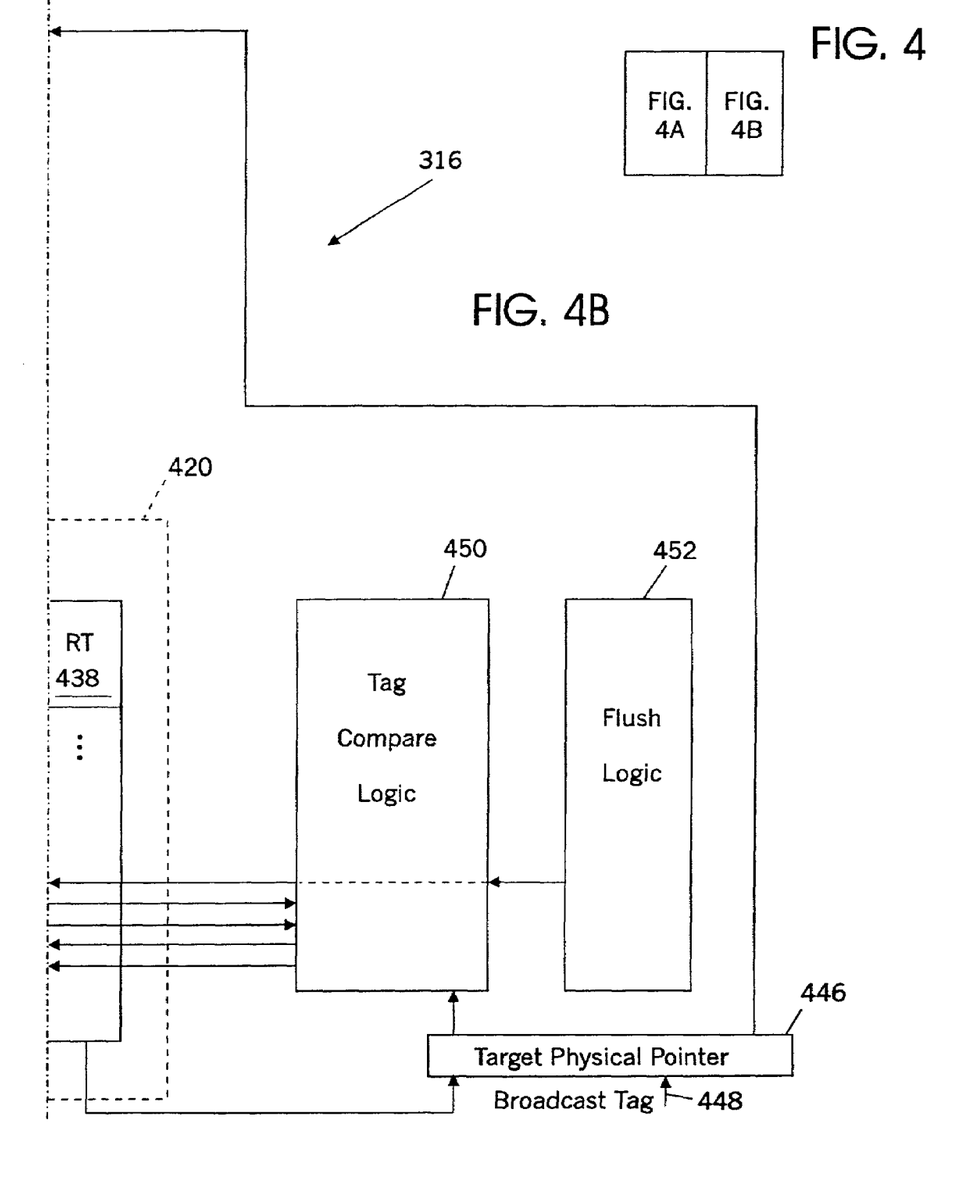
FIG. 4 illustrates, in block diagram form, a self-initiated instruction issuing mechanism in accordance with an embodiment of the present invention.
Figure 4A:
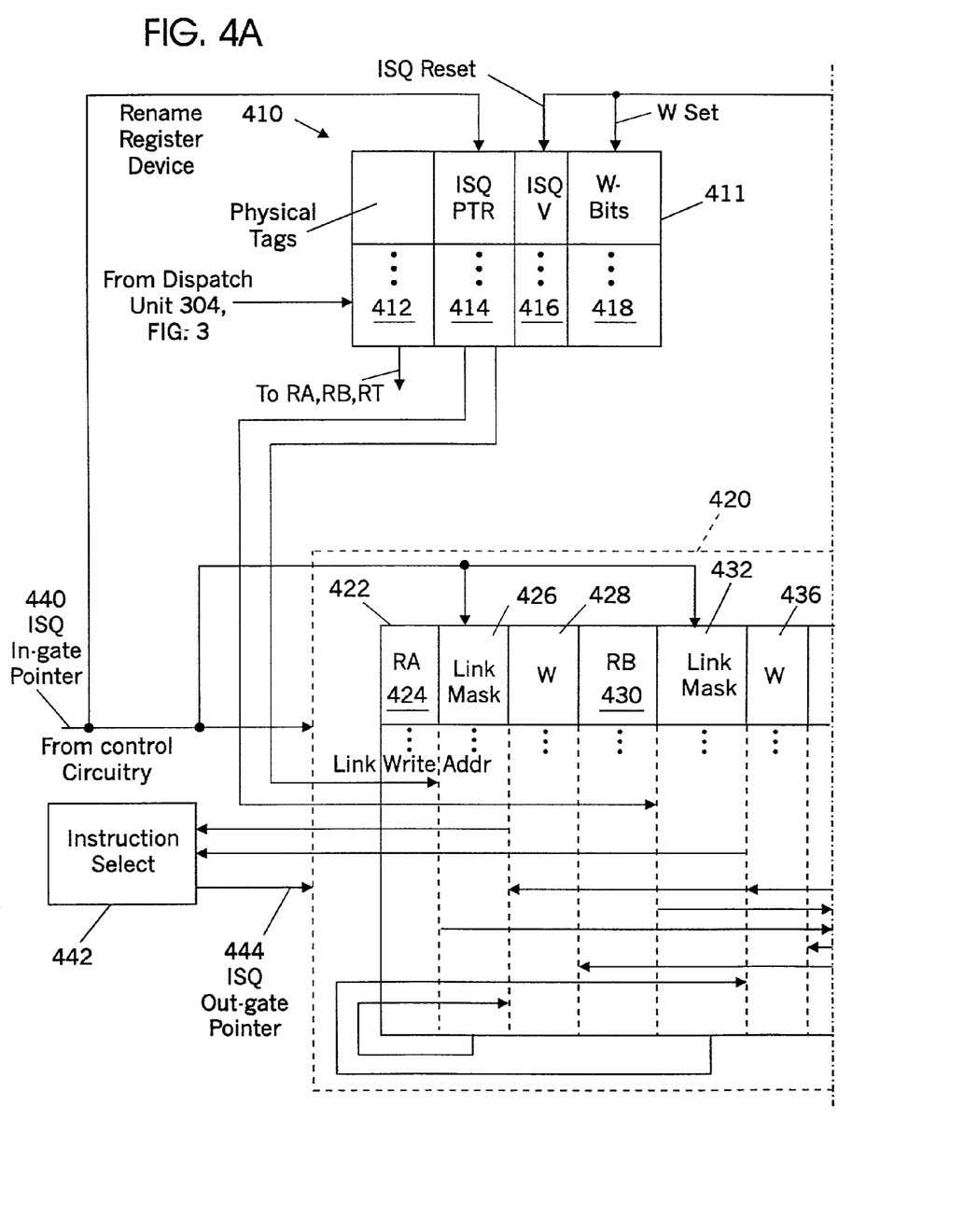

FIG. 4 illustrates self-initiated issuing mechanism 316 according to the principles of the present invention. Self-initiated issuing mechanism 316 includes rename register device 410 having a plurality of entries 411. Each entry 411 includes an operand tag portion 412, an ISQ pointer (PTR) portion 414, an ISQ validity (V) portion 416, and a W-bits portion 418. Rename register device 410 is coupled to dispatch unit 304 (FIG. 3) for receiving a plurality of instruction operands therefrom. Rename register device 410 is coupled to ISQ 420 which contains a plurality of entries 422. An embodiment of the present invention may have a predetermined number "n" of entries 422. Each of the entries 422 contains operand tag portions 424, 430, and 438 for receiving operand tags corresponding to source operands RA and RB, and target operand RT, respectively. RA portion 424 and RB portion 430 receive operand tags from the corresponding general tags portion 412 in rename register device 410. RT portion 438 receives a target physical tag that is assigned to the dispatching instruction in rename register device 410. Each entry 422 also includes an instruction control portion (not shown) for containing control information for execution units 318 (see FIG. 3). The instruction control portion has not been shown for simplicity.

Each entry 422 also includes a link mask portion and a W portion associated with each source operand. Link mask 426 is associated with source operand RA, and link mask 432 is associated with source operand RB. Likewise, W portion 428 and W portion 436 are associated with operand RA and operand RB, respectively. ISQ 420 receives an ISQ in-gate pointer 440 which points to the ISQ entry 422 receiving the data corresponding to the dispatching instruction. ISQ in-gate pointer 440 is received from control circuitry, not shown. ISQ in-gate pointer 440 may also be loaded into rename register device 410 in ISQ pointer portion 414.

ISQ 420 is also coupled to instruction select logic 442. Instruction select logic 442 selects instructions for issuing. Instruction select logic 442 outputs an ISQ out-gate pointer 444 which addresses the ISQ entry 422 containing the data associated with the instruction to be issued. Instruction select logic 442 receives operand ready information associated with operand RA from W portion 428 and operand ready information associated with operand RB from W portion 436. ISQ 420 is also coupled to target tag register 446.

Target tag register device 446 receives and stores a broadcast tag 448. If an issuing instruction does not generate architected register data three cycles after issue, operand dependencies are resolved using a broadcast tag mechanism, to be described. Target tag register device 446 is coupled to tag compare logic 450 for receiving a broadcast target physical pointer therefrom. Tag compare logic 450 is also coupled to ISQ 420 for receiving source operand physical tags from portions 424 and 430 of ISQ entries 422. Target tag register 446 is also coupled to rename register device 410 for communicating the broadcast target tag thereto.

Data in queue entries 422 are flushed when their corresponding instruction issues or is cancelled. Flush logic 452 is coupled to ISQ 420 for resetting data values in link mask portions 426 and 432 of ISQ entries 422.

Description of Operation

FIG. 2 illustrates a data processing system 200 which implements one embodiment of the present invention. It should be noted that the present invention is implemented in a portion of CPU 210 and is used to provide data and control information to a remaining portion of data processing system 200.

FIG. 3 illustrates the portion of CPU 210 in greater detail. During operation of one embodiment of the present invention, instructions are fetched from I-cache 302 and provided to dispatch unit 304 with the appropriate control signals for their execution. Dispatch unit 304 includes a predetermined plurality of register devices which contain instruction control information and instruction operand information. Instructions are partially predecoded in dispatch unit 304 and dispatched to the corresponding one of FXU 306, load/store unit 308 and FPU 310 for performing the required operation on the source operand data under the control of the instruction control data.

Instructions dispatched from dispatch unit 304 to the corresponding one of FXU 306, load/store unit 308 and FPU 310 are sent to self-initiated issuing mechanism 316 within each of FXU 306, load/store unit 308, and FPU 310. Self-initiated issuing mechanism 316 issues instructions to execution units 318 for performing operations on the instruction operand data under the control of the instruction control data.

Refer now to FIG. 4 illustrating a portion of self-initiated issuing mechanism 316. Rename register device 410 receives a logical operand data from dispatch unit 304 in FIG. 3. Rename register device 410 associates operand tags in portion 412 with the logical operands of the dispatching instruction and provides these to the corresponding entry 422 in ISQ 420. The corresponding entry 422 is addressed by ISQ in-gate pointer 440 generated by control circuitry (not shown). This ISQ in-gate is calculated by checking which entries of ISQ 422 are empty and then one of the empty entries is selected. In an embodiment of the present invention, a lowest empty entry may be selected, wherein a lowest empty entry has a smallest index value indexing into ISQ 420. ISQ in-gate pointer 440 is also provided to ISQ pointer portion 414 in rename register device 410.

If the dispatching instruction produces architected register device data (i.e. a result) such that a subsequent instruction can use the result in the following cycle (a so-called "one-cycle piped" instruction), then ISQ in-gate pointer 440 is stored in portion 414 of a rename register device entry 411 corresponding to the target operand of the dispatching instruction. ISQ validity portion 416 is also set to a predetermined value, which in an embodiment of the present invention may be one, to indicate that the instruction that produces the result for the target operand tag 412 is in the ISQ entry pointed to by ISQ pointer 414.

If, however, the dispatching instruction does not produce architected register device data such that a subsequent instruction can use the result in the following cycle, the ISQ pointer portion 414 in rename register device entry 411 corresponding to the target operand tag is reset to a predetermined value, which in an embodiment of the present invention, may be zero. The ISQ validity data value in portion 416 is also reset to a second predetermined value, which may be zero in accordance with one embodiment of the present invention.

When an instruction is dispatched from dispatch unit 304, its physical tags associated with operand RA and RB are obtained from rename register device 410. One entry 411 per source operand is obtained from rename register device 410. Associated with physical pointer 412 for each operand is an ISQ pointer 414 and an ISQ V bit 416. As the dispatching instruction is in-gated into the ISQ location determined by ISQ in-gate pointer 440, the ISQ pointer value obtained from portion 414 in rename register device entry 411 corresponding to source operand RA of the dispatching instruction is used to address the ISQ entry 422 corresponding to the dispatching instruction; at this ISQ entry 422, if the ISQ V bit 416 corresponding to the RA operand of the dispatching instruction is active, the bit of link mast 426 that is indexed by ISQ in-gate pointer 440 is set to a predetermined value, which, in an embodiment of the present invention, may be one. Likewise, the ISQ pointer value obtained from portion 414 in rename register device entry 411 corresponding to source operand RB of the dispatching instruction is used to address the ISQ entry 422 corresponding to the dispatching instruction; at this ISQ entry 422, if the ISQ V bit 416 corresponding to the RB operand of the dispatching instruction is active, the bit of link mask-432 that is indexed by ISQ in-gate pointer 440 is set to a predetermined value, which, in an embodiment of the present invention, may be one. In an embodiment of the present invention, link mask data values in link mask portion 426 and link mask portion 432 may contain a number of bits having a same number, n, of ISQ entries 422 in ISQ 420. In this way, the link mask in the target instruction (already in ISQ 420) indicates, to the target instruction, the entry in ISQ 420 that the dispatching dependent instruction will occupy.

Instruction select circuitry 442 examines all W portions 428 and 436 to find instructions with operands that are ready (i.e., the W values of the RA and RB operands for that instruction are active). One ready instruction is selected for issuing to the execution unit. When the target instruction is issued to execution unit 318, its RA link mask, in portion 426, and RB link mask, in portion 432, are used to write into W portion 428, and W portion 436 of the corresponding ISQ entries 422, respectively. In an embodiment of the present invention wherein link mask portions 426 and 432 include n bits, the active bits in an n-bit RA link mask 426 are written to the corresponding bits in W portion 428. Likewise, the active bits in the n-bit RB link mask 432 are written to the corresponding bits in W portion 436. The W data value in portion 428, signals to instruction select logic 442 that the RA source operand in portion 424 is available. Similarly, W data value in portion 436 signals to instruction select logic 442 that source operand RB, having an operand tag in portion 430, is available. For example, for numbers i and j that are less than n, if the dispatching instruction is being gated into entry "i" of ISQ 420, and the ISQ PTR 414 corresponding to the RA operand of the dispatching instruction has the value j, and the ISQ V 416 corresponding to the RA operand of the dispatching instruction is active, then the bit "i" of link mask 426 of the "j" ISQ entry 422 is set. This indicates that the instruction in the "j" ISQ entry 422 generates the result that the RA operand in the "i" ISQ entry 422 uses. When the instruction at the "j" ISQ entry 422 is issued, the active bits in the n-bit RA link mask 426 at the "j" ISQ entry 422 is written to the W portion 428. Since bit "i" of the RA link mask 426 at the "j" ISQ entry 422 is active, the W portion 428 at the "i" ISQ entry 422 is set, indicating that the RA operand at the "i" ISQ entry 422 is ready.

If the issuing target instruction is not a one-cycle piped execution instruction, the link masks, just described, are not used to resolve operand dependencies. For this class of instructions, the operand tag of the target operand is broadcast three cycles before the target data is available. The broadcast tag is latched into register device 446. Tag compare logic 450 receives the physical tags of source operands RA in portion 424 and RB in portion 430 from each of the plurality of entries 422 in ISQ 420, and compares the source operand physical tags with the broadcast target operand tag forming the contents of register device 446. Because the target operand data value will not be returning for three cycles, the comparison performed by tag compare logic 450 need not, in an embodiment of the present invention, be in the same cycle at which the instruction generating the target operand data value is issued.

Rename register device 410 includes an additional mechanism by which a dispatching instruction may resolve its source operand dependencies. The W-bits portion 418 in each entry 411 in rename register device 410 informs the dispatching instruction if one or more of its source operand data values is available to it. If the issuing instruction is a one-cycle piped execution instruction, a cycle after that instruction issues, a data value is set in W-bits portion 418 in the entry 411 corresponding to the target operand tag. The ISQ V portion 416 in the entry 411 corresponding to the target operand tag is also reset to indicate that ISQ PTR portion 414 is no longer valid. That is, the instruction that sets the target operand associated with the tag 412 in entry 411 has been issued and is no longer in the ISQ.

The operation of the W-bits portion 418 in rename register device 410 is similar for issuing instructions that are not one cycle piped execution instructions. Recall that for such instructions, the link mask mechanism is not used, instead the physical target tag is broadcast three cycles before the target data is available. When the tag is broadcast, a data value is set in W-bits portion 418 in the entry 411 corresponding to the broadcast target operand tag.

A dispatching instruction accessing rename register device 410 may use the W-bits portion 418 data values to resolve source operand dependencies. When the dispatching instruction accesses rename register device 410 to get source operand tags, it also gets the W-bit data values in W-bits portion 418 in entries 411 corresponding to target operand tags, in portion 412, that match its source operand tags. If any of the W-bit data values in the corresponding one of portion 418 is set, then as the dispatching instruction is in-gated into ISQ 420, a data value is set in the corresponding one of W portion 428 and W portion 436 is set. Then, W portions 428 and 436 are used by instruction select 442 for selecting instructions ready for issuing, as previously described. Note that the setting of W-bits portion 418 may be a write-through action wherein the data value in W-bits portion 418 is immediately available for access by a dispatching instruction. In this way, tag comparison circuitry in the prior art, such as tag compare 174 in FIG. 1 is eliminated according to the principles of the present invention.

Figures 5, 5A:
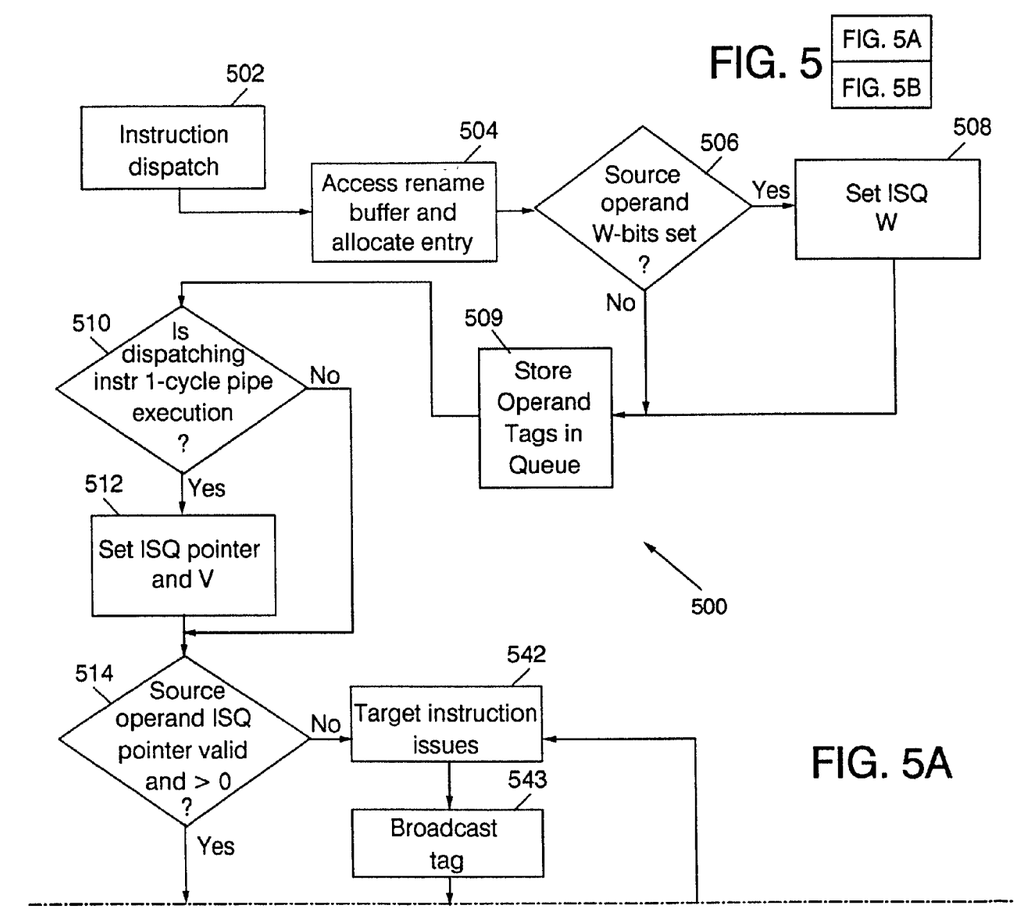
FIG. 5 illustrates, in flowchart form, a method of self-initiated instruction issuing in accordance with an embodiment of the present invention.
Figure 5B:
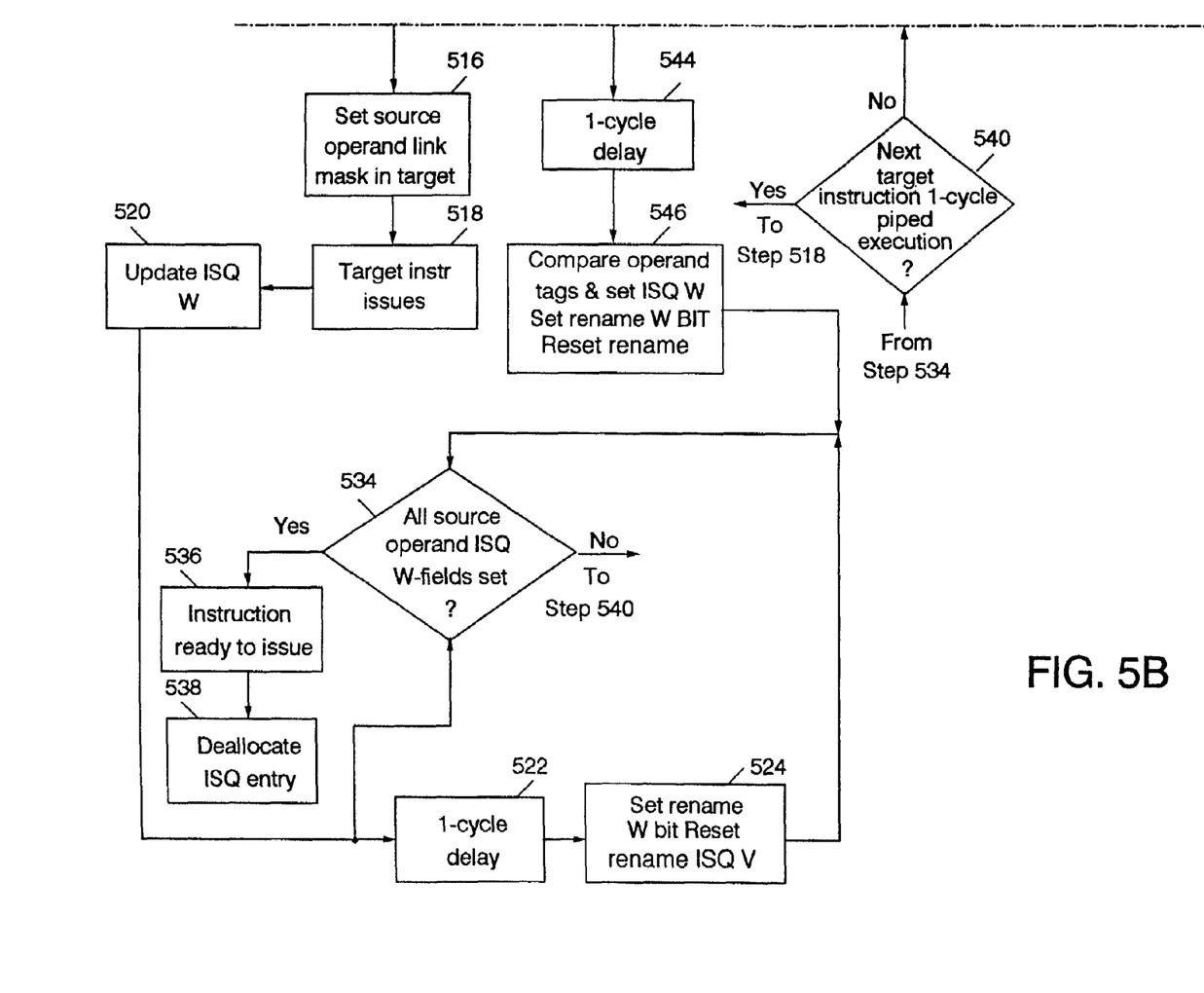

The operation of self-initiated issuing mechanism 316 may be further understood by referring now to FIG. 5 in which is depicted a flowchart illustrating a self-initiated issuing method in accordance with the principles of an embodiment of the present invention.

On instruction dispatch, in step 502, rename register device 410 is accessed, and an entry 411 is allocated to the dispatching instruction, in step 504. If, in step 506, W-bits portions 418 in entries 411 corresponding to the target instruction associated with the dispatching instruction's source operands are set, then in step 508, the corresponding ones of W portion 428 and 436 are set on the in-gating of the instruction into ISQ 420. Otherwise, in step 506, W portions 428 and 436 of ISQ 420 remain in their inactive state. In step 509, the operand tags of the dispatching instruction are stored in their respective portions, 424, 430 and 438, of the corresponding entry 422 in queue 420.

If, in step 510, the dispatching instruction is a one-cycle piped execution instruction, in step 512, the ISQ pointer corresponding to its designated entry in ISQ 420 is stored in ISQ pointer portion 414 of its entry 411 allocated in step 504. ISQ pointers are provided by circuitry controlling instruction dispatch (not shown). ISQ pointers are determined as previously described. ISQ validity portion 416 in the entry 411 allocated in step 504 is also set in step 512. Otherwise, in step 510, the ISQ pointer portion 414 and ISQ validity portion 416 remain in their inactive state. In an embodiment of the present invention, the inactive state of ISQ pointer portion 414 may have the value 0.

The dispatching instruction accesses ISQ pointer portion 414 and ISQ validity portion 416 of entries 411 associated with target instructions corresponding to its source operands. If in step 514, an ISQ pointer of a target instruction corresponding to a source operand is valid, that is its ISQ validity portion 416 is set, and its ISQ pointer portion 414 has a valid pointer value, then in step 516, the corresponding ones of source operand link mask portion 426 and 432, in entry 422 of the target instruction, are set. One or more cycles later, the target instruction issues in step 518, and the one of ISQ W portion 428 and 436 corresponding to the source operand depending on the target instruction is updated in step 520. Following a one cycle delay, in step 522, after issuing the target instruction in step 518, a data value in W-bits portion 418 in entry 411 corresponding to the target instruction is set in step 524. ISQ V portion 416 is also reset in step 524.

If, in step 534, the one of ISQ W portion 428 and 436 resolves all source operand dependencies, the dependent instruction is ready to issue in step 536, and its ISQ entry is de-allocated in step 538. However, if the update in step 520 does not resolve all source operand dependencies in step 534, the instruction may not issue until all source operands are available. If, in step 540, the next target instruction is a one-cycle piped execution instruction, method 500 returns to step 518. Otherwise, the target instruction issues in step 542. Note that, if in step 514, the dispatching instruction had not obtained a valid ISQ pointer in ISQ pointer portion 414 in rename register device 410, method 500 would also traverse the path beginning with the issuance of the target instruction in step 542.

After the target instruction issues in step 542, in step 543 the target operand physical tag is broadcast three cycles before the target operand value is available. In step 544, a one cycle delay elapses. In step 546, source and target operand tags are compared by comparison logic 450 in FIG. 4 and the one of ISQ W portions 428 and 436 corresponding to the source operand dependent on the target instruction is set. A data value in W-bits portion 418 in the entry 411 corresponding to the target instruction issued in step 542 is also set in step 546 and ISQ V portion 416 is reset. The instruction target operand is obtained from the architected register, step 532.

As previously described, if, in step 534, all source operand dependencies of the dependent instruction have been resolved by the target instruction issued in step 542, the dependent instruction is ready to issue in step 536 and its ISQ entry is de-allocated in step 538. Otherwise, method 500 returns to step 540, and method 500 loops until the dependent instructions source operands have all been resolved.

Although the present invention and its advantages have been described in detail, it should be understood that various changes, substitutions and alterations can be made herein without departing from the spirit and scope of the invention as defined by the appended claims.

What is claimed is:

1. An apparatus for self-initiated instruction issuing comprising:
    an instruction queue operable for issuing at least one instruction to an execution unit, said queue including a plurality of entries, each queue entry having a first portion and a second portion, said first portion operable for storing a first link data value and said second portion operable for storing a first data value, said first portion comprising a link mask and said first link data value indicating a target instruction which of the queue's plurality of entries that a dispatching dependent instruction will occupy, wherein said first data value in a first queue entry is set in response to a first link data value in a preselected second queue entry, wherein at least one instruction is selected for issuing in response to a predetermined first data value in a corresponding queue entry;
    a rename register device coupled to said queue, said rename register device including a plurality of entries, each entry having a first portion operable for storing a pointer data value and a second portion operable for storing a validity data value, wherein each said pointer data value is associated with a corresponding queue entry, wherein each said first link data value is set in response to said pointer data values and said validity data values, wherein each said rename register device entry includes a third portion operable for receiving a plurality of operand tags, and wherein each said pointer data value is operable for selection in response to a preselected one of said plurality of operand tags, wherein each said queue entry includes a third portion coupled to said rename register device for receiving a first one of said plurality of operand tags, and a fourth portion coupled to said rename register device for receiving a second one of said plurality of operand tags, wherein said first and second operand tags are associated with a dispatching instruction, and wherein said first operand tag is further associated with said first link data value, wherein said queue is operable for broadcasting a preselected first operand tag; and
    a storage device operable for receiving said broadcasting of said first operand tag, wherein each said rename register device entry includes a fourth portion operable for storing a second data value, said second data value being operable for setting in response to an issuing instruction.

2. The apparatus of claim 1 wherein said first data value is operable for setting in response to said second data value.

3. The apparatus of claim 1 each said queue entry further comprises a fifth portion operable for storing a second link data value and a sixth portion operable for storing a second data value, and a seventh portion coupled to said rename register device for receiving a third one of said plurality of operand tags, said third operand tag being associated with said dispatching instruction, and wherein said third operand tag is further associated with said second link data value, and wherein said second data value in said first queue entry is set in response to a preselected second link data value in a third queue entry.

4. The apparatus of claim 3 wherein each said second link data value is set in response to said pointer data values and said validity data values.

* * * * *